July 3, 1962 R. C. BIERMAN 3,042,331

TAPE RECORDER

Filed May 21, 1958

INVENTOR.

Raymond C. Bierman,

BY Mueller & Aichele

Att'ys.

3,042,331
TAPE RECORDER

Raymond C. Bierman, Clarendon Hills, Ill., assignor to Motorola, Inc., Chicago, Ill., a corporation of Illinois Filed May 21, 1958, Ser. No. 736,818
3 Claims. (Cl. 242—55.13)

This invention relates to apparatus for handling an elongated web of ribbon-like material and more particularly to guide means for use in conjunction with devices employing such webs as, for example, tape recorders and reproducers. This invention also relates to a tape recorder employing such guide means for handling a web of magnetic tape.

In the ensuing specification and claims the term "tape recorder" is used to refer to apparatus performing both sound recording and reproducing functions and using an elongated web of ribbon-like magnetic tape. Such devices conventionally employ a let-off reel from which the tape is fed past a recording and/or reproducing head to a take-up reel upon which the web of tape is wound as it is used. Usually the reels are mounted side by side on a support and rotate in the same plane. The disadvantage of this arrangement is that a sufficiently large support must be provided to accommodate the tape reels in this relation. In order to conserve space and provide a more compact tape recorder, it would be desirable to mount the let-off and take-up reels coaxially of one another. Devices embodying this arrangement have, however, tended to distort or stretch the tape web in transferring it from the plane of the let-off reel to that of the take-up reel. This distortion is particularly objectionable in tape recorders since it results in an abberation of the recorded or reproduced sound.

It is an object of this invention to provide simple and effective guide means for use in moving an elongated web of ribbon-like material from one plane to another.

It is another object of the invention to provide guide means for use in a tape recorder or the like which permits the coaxial mounting of let-off and take-up reels without causing tape distortion.

It is a further object of the invention to provide a compact tape recorder including coaxially mounted reels and non-distorting guide means for guiding tape from the plane of one reel to the plane of the other so that sound or other intelligence recorded on the tape or reproduced therefrom is not abberated.

A feature of the invention is the provision of a pair of conical guide members mounted inversely with respect to one another and providing guide surfaces along which an elongated web is passed.

Another feature of the invention is the provision of a pair of conical guide members mounted with their axes parallel to one another and tilted to form acute angles with the plane parallel to reels so that the members cooperate to guide a web from a first plane through a sloping travel plane to a second parallel travel plane.

A further feature of the invention is the mounting of a pair of such conical guide members in such a way that a tape web approaching them contacts their surfaces along a line in a plane parallel to a tape surface and extending transversely of the web so that there is no tendency of the tape to stretch or be otherwise distorted in wrapping around the guides and conforming to their conical surfaces.

In accordance with a particular embodiment of the invention, a tape recorder includes a pair of coaxially mounted reels rotating in spaced apart horizontal planes. A pair of conical guide members are provided for guiding the tape from one plane to another without stretching or otherwise distorting it. The conical guide members are mounted inversely with respect to one another; that is, one of the cones has its apex end pointing in one direction and the other has its apex end pointing in the opposite direction. A tape web from the let-off reel approaches first guide member in an initial travel path, wraps partly around its surface and has its travel path angularly displaced since the cone is mounted with its axis tilted to form an acute angle with respect to the reel plane. The web passes along an angular travel path to the second guide member, is wrapped partly around its surface and leaves along a terminal travel path parallel to and vertically spaced from the initial travel path. This last-named travel path is in a plane corresponding to the plane in which the take-up reel rotates. The second guide member is mounted inversely with respect to the first and has its axis parallel to the axis of the first member. Since the initial end terminal travel paths of the tape are fixed by the planes of rotation of the reels, it is desirable to mount the guide members so that they present contact edges at the ends of these travel paths which are parallel to the tape surfaces as the web moves along these planes so that the tape is not stretched or otherwise distorted as it wraps around the conical surface and forms thereto.

Figure 1:
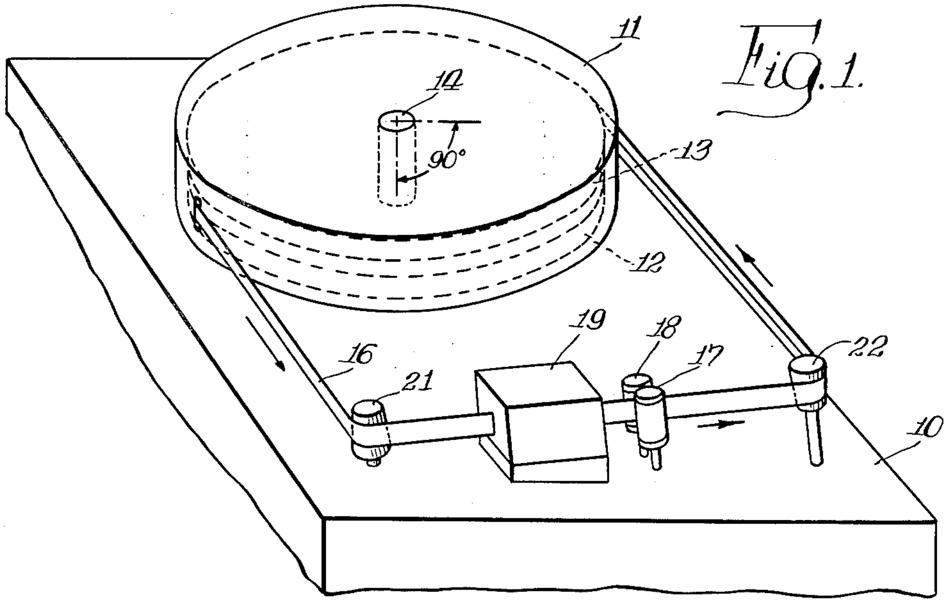
FIG. 1 is a perspective view showing the top of a tape recorder having coaxially mounted reels and employing tape guides in accordance with one embodiment of this invention.

The tape recorder illustrated in FIG. 1 includes a substantially horizontally extending support surface or deck 10 and a cylindrical tape magazine 11. The magazine 11 houses coaxially mounted let-off reel 12 and take-up reel 13. The magazine and the reels fit around a central spindle 14 which is rotated through suitable rotor means not shown to provide rotation of the reels. An elongated web 16 of ribbon-like magnetic tape is shown as moving from the let-off reel 12 to the take-up reel 13. The tape is pulled from the let-off reel by the action of the rotating capstan 17 and passes between it and the cylindrical guide 18 extending above the deck 10. In its passage the tape passes through the housing 19 which contains suitable recording and reproducing heads not shown.

The tape web 16 is guided from one reel to another by the conical guide members 21 and 22. In the embodiment illustrated, these guides are in the form of frustums of cones but it will be understood that they may be an entire cone or that only a sector of the conical surface sufficient to contact the tape web may be employed. Although the guides are shown as fixed they may be mounted to rotate about their respective axes. The guide 21 is mounted with its small area or apex end pointing upward while the guide 22 is inversely mounted with its larger area end pointing upward. Because the tape web 16 follows an angular travel path intermediate the guides 21 and 22, it is preferred to mount the capstan 17 and the cylindrical guide 18 as well as the recording and reproducing heads within housing 19 at an angle with respect to the vertical.

Figures 2, 3, 4, 5, 6:
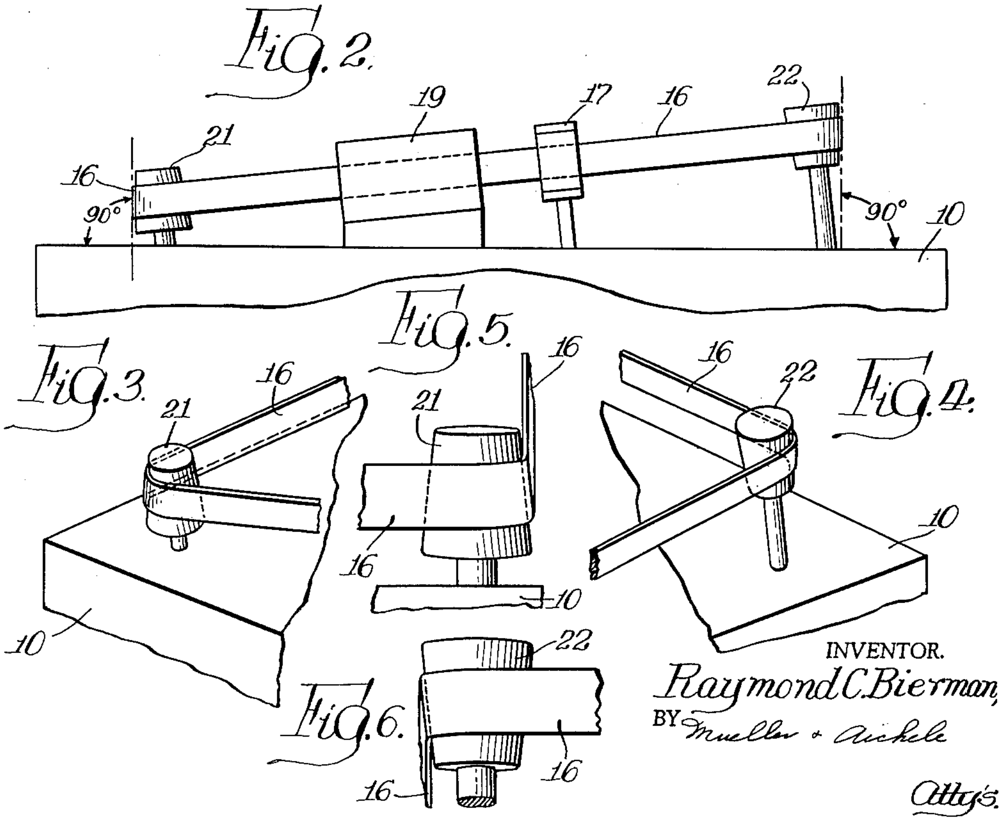
FIG. 2 is a view in front elevation of the tape recorder showing a tape web passing between the pair of conical tape guides.
FIG. 3 is a detailed perspective view of a tape web passing around the surface of one of the tape guides.
FIG. 4 is a similar view of the other tape guide.
FIG. 5 is a side view of the tape guide shown in FIG. 3 looking toward the other guide.
FIG. 6 is a side view of the tape guide shown in FIG. 4 looking toward the other guide.

In operation of the device, the tape web 16 passes first through an initial travel path between the let-off reel 12 and the first guide member 21, an intermediate or angular guide path between the guides 21 and 22 and a terminal travel path between the guide 22 and the take-up reel 13. Since the reels 12 and 13 rotate in horizontal planes, it is necessary that the initial and terminal travel paths be in these same planes, i.e., the initial travel path is in the plane of rotation of let-off reel 12 and the terminal travel path is in the plane of rotation of take-up reel 13. The tape web 16 in the initial travel plane thus has its transverse dimension, that is, from one edge to the other, essentially vertical and perpendicular to the travel plane. This is illustrated in FIG. 2. In order to avoid twisting and subsequent distortion of the tape web as it wraps around the guide 21, the latter is so disposed that its surface edge presents a line of contact parallel to the transverse surface of the tape. As particularly shown in FIG. 3, the web 16 wraps itself partially around the conical surface of guide member 21 and its direction of travel is deflected through an angle of 90°.

Because the axis of the conical guide 21 is tilted with respect to the vertical, the intermediate travel path of the tape web is angularly displaced through an angle of elevation equal to the angle between the axis of the cone and the vertical. The intermediate travel path is displaced upwardly as shown because of the configuration of the conical member 21 so that its apex end or small area end is at its top.

As shown in FIGS. 2 and 4, the tape web 16 passes along its angular travel path and reaches the second conical guide member 22. Function of this guide member is to displace the web from the angular travel path to a terminal travel path which is parallel to and vertically spaced from the plane of the initial travel path and which corresponds to the plane in which the take-up reel 13 rotates. In order to avoid twisting of the tape, the axis of conical member 22 is also tilted with respect to the vertical and is parallel to the axis of member 21. In wrapping around the member 22 the web turns through an angle of 90° and, in conforming to the shape of the conical surface, moves away from the guide member 22 along a horizontal terminal travel path. Because guide member 22 performs a function essentially the inverse of the function performed by guide member 21, it is mounted inversely from guide member 21, that is with its small area or apex end pointing downwardly. This configuration results in displacement of the tape web 16 from an upwardly pointing direction to a horizontal direction which, however, is spaced vertically from the plane of the initial travel path.

As particularly shown in FIG. 2, the guide member 22 is mounted so as to present a contact edge at the end of the terminal travel path which is essentially vertical. Thus, when the tape recorder is operated in the rewind direction, so that the tape is passed from take-up reel 13 to let-off reel 12, the tape in the path between the take-up reel and the guide member 22 approaches the guide member and "sees" a vertical line of contact. This avoids twisting of the tape web for the same reasons such action is avoided when tape passes from let-off reel 12 to guide member 21 during forward operation.

This invention has been described with particular reference to its application to tape recorders because it is particularly important in such systems to avoid stretching, twisting or similar distortion of the tape web. Such action results in a corresponding distortion in accuracy of sound recorded on or reproduced from distorted tape. It will be understood, of course, that the combination of tilted inverse cones may also be applied to the handling of other ribbon-like materials such as motion picture film in which physical distortion is to be avoided for similar reasons.

It will also be appreciated that while the invention has been described as involving the movement of a tape web from one horizontal plane to another the system may be used to displace tape from one vertical plane to another. Also, combinations of pairs of tilted inverse cones may be employed to pass tape without distortion through a succession of travel paths in spaced apart planes which may be parallel or angularly disposed to one another.

The invention therefore, provides an effective yet simple and inexpensive guide system for elongated web of ribbon-like material. The arrangement is particularly useful in tape recorder systems since it permits movement of tape from one plane to another without distortion thereof. The use of the invention in a tape recorder permits the let-off and take-up reels to be mounted coaxially with respect to one another thus providing a device more compact than conventional tape recorders while avoiding the disadvantage of tape distortion.

I claim:

1. Web transport apparatus including in combination means for supplying an elongated, flat web along a first line of travel in a first plane perpendicular to the plane of the web, means for taking up the web along a second line of travel in a second plane parallel to the first plane, a first guide positioned to engage the web in the first line of travel and direct the web toward the second line of travel, a second guide positioned to engage the web from said first guide and direct the same along the second line of travel, said first and second guides having inversely corresponding conical surfaces with the radii which define the contour of said surface of said first guide being of decreasing magnitude in a direction toward the second plane and the radii which define the contour of said surface of said second guide being of decreasing magnitude in a direction toward the first plane, the conical axes of said first and second guides being disposed at corresponding angles with respect to the first and second planes for maintaining the plane of the web perpendicular to the first and second planes during web travel toward and away from said guides thereby preventing distortion or twisting of the web.

2. Tape transport apparatus including in combination, a letoff reel rotatably mounted parallel to a given plane and including means for supplying the tape along a first line of travel, a takeup reel rotatably mounted parallel to the given plane and spaced therefrom by a different amount than said letoff reel and including means for taking up the tape along a second line of travel parallel to the first line of travel, a first guide positioned to engage the tape in the first line of travel and redirect the same by 90° toward the second line of travel, a second guide positioned to engage the tape from said first guide and redirect the same by 90° along the second line of travel, said first and second guides having identical conical surfaces with the radii which define the contour of said surface of said first guide being of decreasing magnitude in a direction toward the takeup reel and the radii which define the contour of said surface of said second guide being of decreasing magnitude in a direction toward said letoff reel, the conical axes of said first and second guides being disposed at the same angle with respect to the given plane for maintaining the plane of the tape perpendicular thereto during tape travel toward and away from said guides thereby reducing distortion or twisting of the tape in traveling between said letoff and said takeup reels.

3. In a tape recorder, the combination of a tape magazine having a pair of concentrically mounted tape reels, a magnetic head, a recording tape adapted to be transferred from one of said reels to the other, means for moving said tape through said head, and a pair of conical guides for guiding said tape between the spacing of said tape reels, one of said guides being positioned to receive the tape from a first of said reels and having the radii which define the contour of the conical surface thereof decreasing in magnitude in a direction toward the other reel and the other of said guides being positioned to direct the tape toward said other reel and having the radii which define the contour of the conical surface thereof decreasing in magnitude in a direction toward the first of said reels, and means for mounting said guides with the conical axes thereof tilted with respect to the axis of said reels so that the plane of said tape is maintained parallel to the rotation axis of said reels during travel thereof toward and away from said guides.

References Cited in the file of this patent

UNITED STATES PATENTS

| | | |
|---|---|---|
| 2,255,724 | Sunell | Sept. 9, 1941 |
| 2,706,638 | Bruderlin et al. | Apr. 19, 1955 |